July 5, 1955
L. SCUSA
2,712,372
NON-CHATTERING, SAFETY AND AUTOMATIC OVERLOAD RELEASE CLUTCHES
Filed March 12, 1954
2 Sheets-Sheet 1
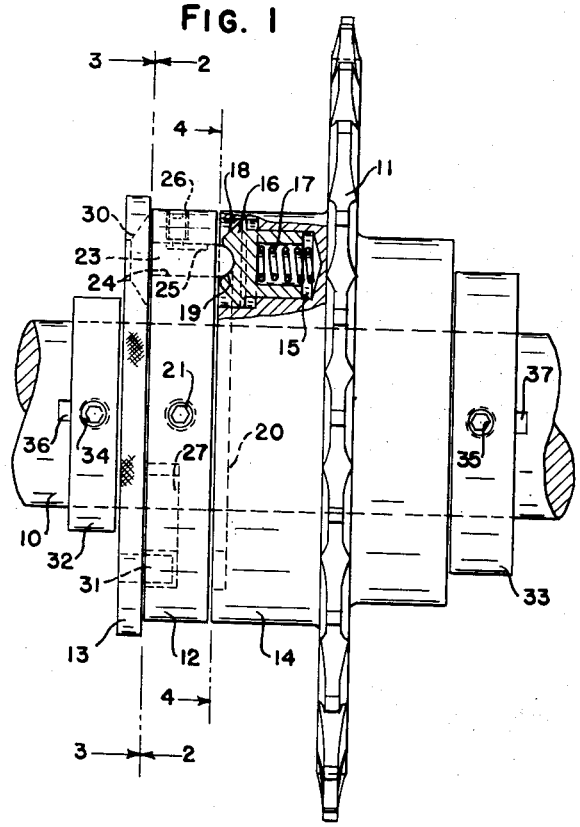
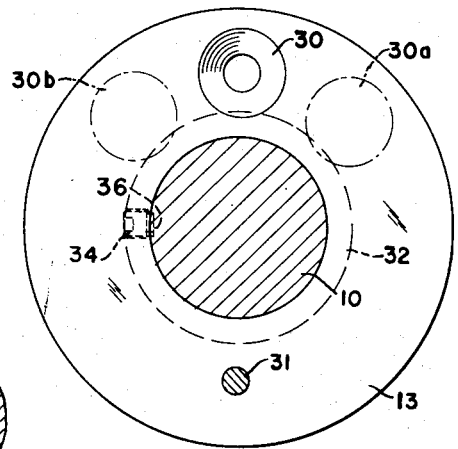
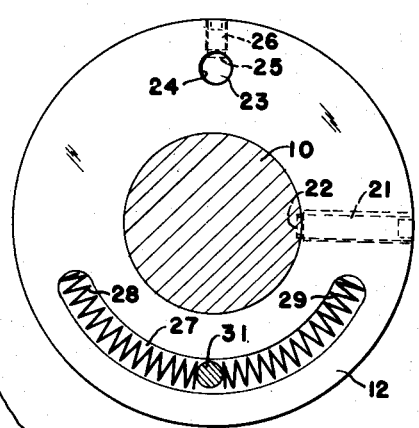
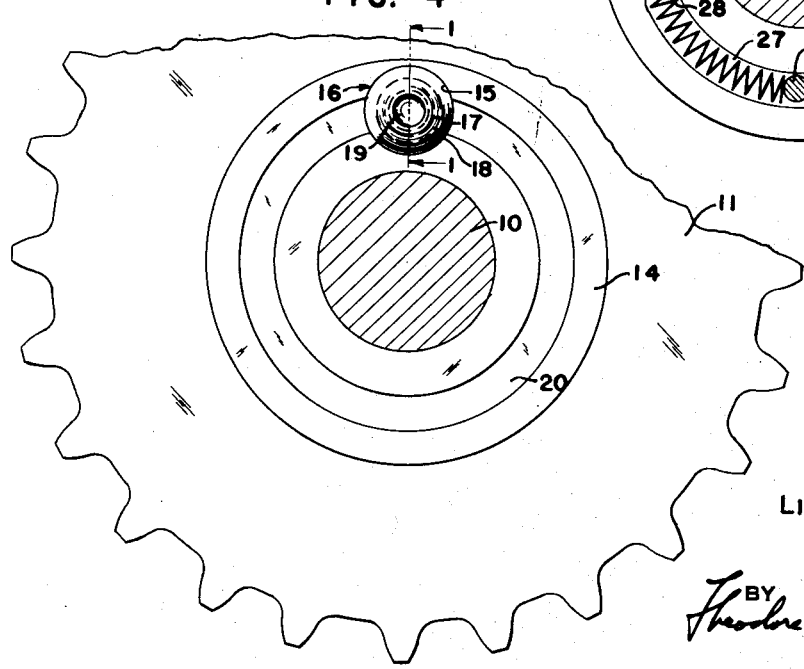
LINO SCUSA
INVENTOR
BY Theodore E. Simonton
ATTORNEY July 5, 1955
L. SCUSA
2,712,372
NON-CHATTERING, SAFETY AND AUTOMATIC OVERLOAD RELEASE CLUTCHES
Filed March 12, 1954
2 Sheets-Sheet 2
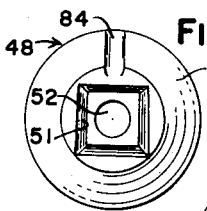
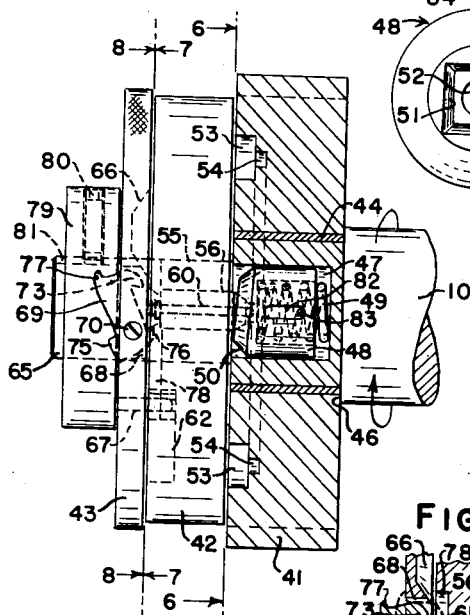
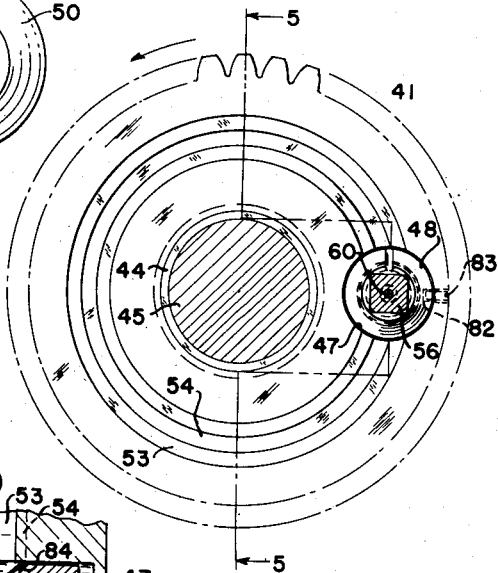
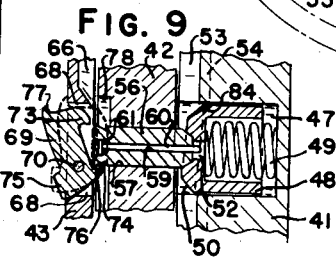
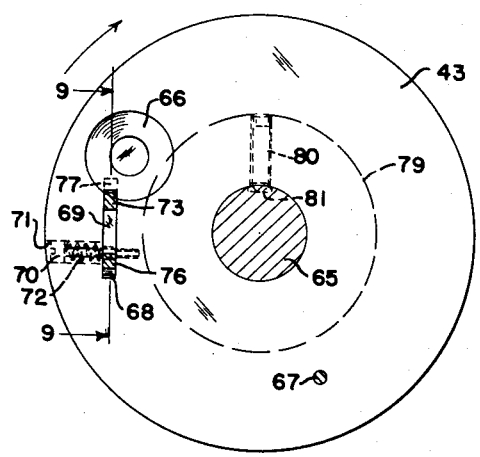
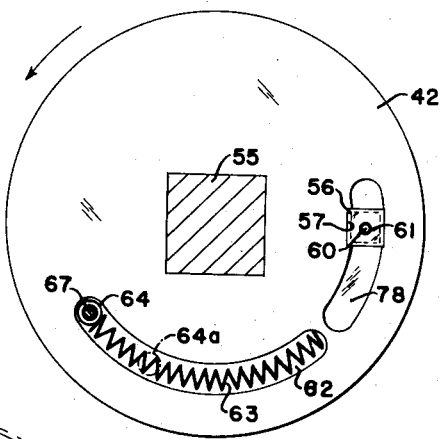
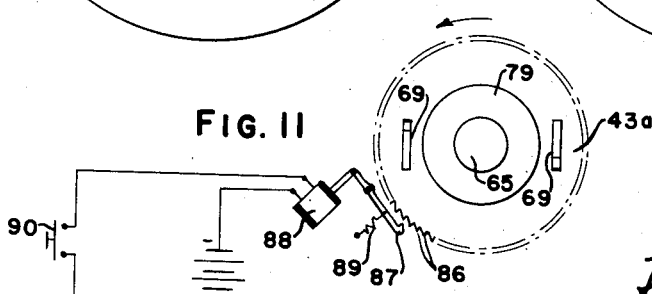
LINO SCUSA
INVENTOR
BY Theodore E. Simonton
ATTORNEY

United States Patent Office 2,712,372
Patented July 5, 1955

2,712,372

NON-CHATTERING, SAFETY AND AUTOMATIC OVERLOAD RELEASE CLUTCHES

Lino Scusa, Phoenix, N. Y., assignor to Phoenix Gage Company, West Phoenix, Town of Lysander, N. Y., a partnership Application March 12, 1954, Serial No. 415,825

9 Claims. (Cl. 192—56)

This invention relates to automatic overload release clutches that are adapted for use also as remote controlled safety clutches, and more particularly to such clutches of the pin and socket type that are non-chattering, easily resettable, and of relatively simple construction.

Many types of machines require overload release devices to prevent damage to the machines should they become jammed or otherwise accidentally stall. For machines that are intended to be run unattended or substantially unattended for considerable periods, it is customary to employ automatic overload release clutches that, when once overloaded, will remain in their released position until reset by the operator. Various clutches of this description have heretofore been used. Many are unnecessarily complicated. Some are difficult to reset. Some have the disadvantage that they chatter noisily after the driving connection is broken, thus requiring prompt shut-off of the power source if substantial wear of the clutch is to be avoided, and such clutches are also subject to possible temporary re-engagement, which is highly undesirable.

For some machines, it is desirable to have not only an automatic overload release clutch, but also safety means for breaking the drive connection, either automatically or at the will of the operator, if circumstances develop that appear to be leading to trouble. For example, in the manufacture of paper goods, certain machines using glue are run in production under the constant supervision of an operator whose duty it is to shut off the machine if the paper feed breaks or a new roll of paper feed stock is needed or the like. But at night, the machine is allowed to run free and unattended in order to keep the glue from drying on the drollers and thus avoid the necessity of a laborious cleaning operation at the start of a working day. Such machines therefore should have both a remote controlled safety clutch and an automatic overload release clutch.

The primary object of this invention is to provide an automatic overload release clutch which is of simple construction, which is easily reset, and in which there is no chattering or interference of parts once the drive connection has been broken. Another object is to provide such a clutch that is adapted for use also as a safety clutch under remote control either by the operator or by automatic devices.

Other objects and advantages will be apparent from the following description taken in conjunction with the accompanying drawings, in which:

Figure 1 is a side elevational view of one embodiment of the invention, certain parts being shown in section on the line 1—1 of Figure 4;

Figure 2 is a sectional view on the line 2—2 of Figure 1;

Figure 3 is a sectional view on the line 3—3 of Figure 1;

Figure 4 is a sectional view on the line 4—4 of Figure 1;

Figure 5 is a side elevational view of another embodiment of the invention shown partly in section on the line 5—5 of Figure 6;

Figure 6 is a sectional view on the line 6—6 of Figure 5;

Figure 7 is a sectional view on the line 7—7 of Figure 5.

Figure 8 is a sectional view on the line 8—8 of Figure 5;

Figure 9 is a fragmentary sectional view on the line 9—9 of Figure 7;

Figure 10 is an enlarged view of a portion of the clutch shown in Figure 6; and

Figure 11 is a diagrammatical view of still another embodiment of the invention modified for use also as a safety clutch.

In Figures 1-4 of the drawings, a shaft 10 is mounted in conventional journals, not shown, and rotatably mounted thereon in the order named, are a socket-carrying member 11, a pin-carrying member 12 and a reset member which may be in the form of a disk 13. In the specific construction illustrated, the socket-carrying member 11 is the driving member and the pin-carrying member 12 is the driven member, but it will be understood that these functions could be reversed. Driving member 11 is in the form of a sprocket with a hub 14 and is free to rotate on shaft 10. Hub 14 is formed with a cylindrical well 15 therein. A socket-button 16 is carried in the well 15 and is axially slidable therein, that is to say, lengthwise of shaft 10. The inner end of button 16 is hollow and carries therein a coil spring 17 so as to urge button 16 away from the bottom of well 15 and toward the driven member 12. The surface of the head of button 16 facing driven member 12 is tapered about its perimeter at 18 and contains at its center a hemispheric or tapered socket 19. An annular groove 20, in the surface of hub 14 in which well 15 opens, is substantially at the same radial distance from shaft 10 as the socket 19 (Figure 4).

The driven member 12 is cylindrical in shape and is keyed to shaft 10 as by set screw 21 which is seated in the key slot 22 (Figure 3). A drive pin 23 is borne in driven member 12 in a hole 24 therethrough so as to be slidable lengthwise of shaft 10 and so that its rounded or tapered end may be seated in socket 19 when hole 24 and button 16 are in register. The end of pin 23 toward the reset disk 13 is substantially flat. The driven pin 23 is longer than the hole 24 in which it is carried so that the pin may move to either of two extreme positions, in one of which the tapered end of the pin protrudes from the side of the driven member 12 adjacent the driving member 11, and in the other of which the flat end of the pin protrudes from the side adjacent the reset disk 13. Drive pin 23 is provided with an axially extending groove 25 which cooperates with the set screw 26 in member 12 to limit the axial sliding of the pin which is otherwise freely slidable in hole 24. A curved groove 27 is provided in the face of member 12 toward the reset disk 13 and in this groove lie the helical coil springs 28 and 29.

The reset disk 13 is a circular plate which is rotatable with respect to shaft 10 and is provided with a tapered camming recess 30 (Figure 2), registerable with the drive pin 23. This recess may conveniently be made by drilling a hole through the disk 13, and countersinking the tapered recess 30, but the hole proper performs no operating function in the device. A biasing pin 31 is affixed to reset disk 13 so as to project therefrom and to lie in groove 27 between spring 28 and spring 29 (Figure 3).

Collars 32 and 33 are keyed to shaft 10 by means of set screws 34 and 35 seated in key slots 36 and 37 respectively. Collars 32 and 33 axially retain the reset disk 13 and driving member 11, respectively, on shaft 10 loosely adjacent the driven member 12.

In operation, the driving member 11 turns on shaft 10 and, when the clutch is engaged, carries with it the driven member 12 by reason of the drive pin 23 being seated in the socket 19 of button 16. Shaft 10, keyed to member 12, is thus driven by member 11. It should be understood that, while this driving connection is maintained, the reset disk 13 is turned with respect to driven member 12 from the position shown in Figure 1 to the position indicated in broken lines at 30a or 30b in Figure 2 so that the camming recess 30 is out of register with pin 23. Drive pin 23 is then forced against the adjacent flat surface of reset disk 13 by the spring 17 acting against the tapered end of the pin through the button 16 and the socket 19 in the head thereof, and the resulting friction prevents reset disk 13 from turning with respect to the driven member 12. The flat surface of reset disk 13 thus acts as a holding surface that normally holds the drive pin 23 in engagement with the socket 19.

Since reset disk 13, during driving engagement, is turned with its camming recess 30 out of register with pin 23, the biasing pin 31 is likewise turned and moved in groove 27 from the position shown in Figure 3, and spring 28 or spring 29, according to the direction in which reset disk 13 has been turned, is thereby compressed. Springs 28 and 29 are sufficiently weak, however, so as to be unable to overcome the friction of pin 23 on the holding surface of reset disk 13 caused by the action of spring 17.

Since driven member 12 is keyed to shaft 10, the shaft is turned along with the driving member 11 until the driving connection is broken by reason of the exertion of an overload on the device, which overload forces the drive pin 23 out of the socket 19 in the button 16. Since the driving connection is broken by reason of the camming action of the tapered end of pin 23 on the recess 19 becoming greater than the pressure of spring 17, it is possible, by substituting springs of different strength for spring 17, to adapt the device to break the driving connection at any desired overload limit.

As the driving connection is being broken, button 16 is pushed deeper into the well 15 against spring 17 until pin 23 leaves its seat in button 16. Thereafter, a clear path for the still protruding rounded end of pin 23 is provided by the groove 20 and this end of the pin rides in groove 20 until driving member 11 has made substantially a complete revolution with respect to driven member 12. Pin 23 then is struck by the button 16 which is now pressed against the adjacent surface of driven member 12 by spring 17. As soon as pin 23 is forced out of socket 19, however, it is no longer held against the holding surface of reset disk 13. Spring 28 or spring 29, whichever was compressed by reason of reset disk 13 being turned, now acts against biasing pin 31 and turns reset disk 13 to the position shown in Figure 1, so that the camming recess 30 is in register with pin 23. Although, in the specific construction illustrated, the clear path for the pin 23 is afforded by the groove 20, it will be understood that the same result could be achieved if the side walls of the groove were entirely cut away, the essential conditions being that the pin have a clear path that is normally intersected by the button 16 projecting thereinto.

When the tapered head 18 of button 16 strikes the rounded end of pin 23, therefore, the pin is pushed into the camming recess 30, until its rounded end is flush with the flat surface of member 12, or carried past the same by momentum. Pin 23 cannot slide out through the hole in the bottom of recess 30, because its movement is limited by the axial groove 25 therein in cooperation with the set screw 26. The driving member 11 is now free to turn independent of driven member 12 and there is no interference with pin 23 by button 16. Button 16 may be of hardened steel so that a good bearing surface is obtained between it and the flat face of the driven member 12 against which the button 16 is pressed by the spring 17. Driving member 11 may turn, while driven member 12 is at rest, for an indefinite period of time without damage to any part of the device.

To reset the device, the driving member 11 may be stopped and the driven member 12 may be manually turned until the hole 24, in which pin 23 lies, is aligned with the socket 19 in button 16 as shown in Figure 1. Reset disk 13 is then manually turned with respect to driven member 12 in either direction to the position indicated in broken lines at 30a or 30b in Figure 2. The tapered camming surface of recess 30 cams pin 23 toward the button 16 and forces the pin into socket 19 and pushes button 16 deeper into well 15 against spring 17. Reset disk 13 can then be released because it is now held from turning, with respect to driven member 12, by spring 17 pressing pin 23 against the holding surface of disk 13. Driving member 11 then can be started again and the driven member 12 will be rotated with it through the driving connection of button 16 and pin 23.

When the load carried by driven member 12 is light and the driving member 11 rotates slowly, it is possible to reset the clutch without stopping the driving member 11. Reset disk 13 is manually turned preferably in the opposite direction from that in which driving member 11 is turning, and the camming recess 30 forces pin 23 into the groove 20 in the driving member 11. When button 16 reaches the pin 23, it is pushed into the well 15 against spring 17 by reason of the taper at 18 on its head. Pin 23 snaps into socket 19 and the driving connection is made. If the starting inertia of the driven member 12 and the machine to which it is connected is not too great, the pin 23 remains seated in socket 19 and the driven member 12 again rotates with driving member 11. All set screws are short enough not to project from the device so there are no projections to injure the operator, provided he stays clear of the main driving sprocket and its chain. Reset disk 13 may be lightly knurled as indicated in the drawings, in order to be more readily turned by hand.

Although the reset member 13 is shown as a disk mounted coaxially with the drive and driven members, and such is the preferred construction, it will be apparent that a reset member pivotally mounted on driven member 12 and having a surface adapted to be moved opposite the end of drive pin 23 to hold the pin in the engaged position, would also be effective. Such a reset member should also be spring biased toward a position in which the holding surface is out of registry with the pin 23 and should also have a camming surface for moving the pin into engagement with the socket 19. Such a pivoted reset member should preferably be counterbalanced by a diametrically opposed weight secured to the driven member 12 for offsetting the centrifugal forces of rotation.

Various modifications are shown in the embodiment of the invention shown in Figures 5–10 of the drawings. Driving member 41, driven member 42 and reset disk 43, in that order, are shown (Figure 5) mounted at one end of shaft 10 which is mounted in journals, not shown, in the usual manner. Driving member 41 is shown as a spur gear provided with a bearing sleeve 44 and is free to rotate on a reduced portion 45 of shaft 10, a shoulder 46 being formed between such reduced portion 45 and the remainder of shaft 10. Driving member 41 is provided with a cylindrical well 47 in the flat face adjacent driven member 42. The well 47 carries therein a cylindrical button 48 (Figures 5, 6 and 9) which is axially slidable in the well. The inner end of button 48 is hollow and carries therein a coil spring 49 so as to urge button 48 away from the bottom of well 47 toward driven member 42. The outer surface of the head of button 48 facing driven member 42 is circumferentially tapered at 50 and contains a square tapered socket 51 at the center. A small hole 52 at the center of the bottom of the socket 51 may extend into the hollow inner end of button 48.

An annular groove 53 in the surface of driving member 41 facing driven member 42, is at substantially the same radial distance from shaft 10 as the socket 51 in button 48 (Figure 6). Another smaller annular groove 54 in driving member 41 is provided at the center of the bottom of groove 52.

The driven member 42 is cylindrical in shape and is carried on a squared portion 55 of shaft 10 so as to be keyed thereto. A square drive pin 56 is carried in driven member 42 in a square hole 57 therethrough so as to be slidable axially of shaft 10 and so that the inner, tapered end of the pin may be seated in socket 51 in button 48 when hole 57 and socket 51 are in register. The drive pin 56 is longer than the hole 57 and protrudes alternately toward drive member 41 or reset disk 43. A small central axial hole 59 entirely through drive pin 56 carries therein a small trip rod 60 which extends from one end of the pin to the other and normally projects slightly from the inner, tapered end of pin 56 when the pin is seated in socket 51, the projecting end being contained in the hole 52. A collar 61 is preferably formed on rod 60 near its outer end and adjacent disk 43, to limit its travel within pin 56 toward the driving member 41. The end of pin 56 toward disk 43 is flat and the end cooperating with button 48 has tapered sides cooperating with the socket 51 in button 48.

A curved groove 62 (Figure 8) is provided in the face of the driven member 42 toward the reset disk 43 and in this groove lies the coil spring 63 and the tubular bushing 64.

The reset disk 43 (Figure 7) is a circular plate mounted upon a reduced rounded portion 65 of shaft 10 and may be turned thereon with respect to the driven member 42. A camming recess 66 is provided in the inner face of reset disk 43. This camming recess is registerable with drive pin 56, and has tapered walls capable of camming pin 56 toward the button 48. It will be noted that recess 66 does not extend all the way through the reset disk 43. A biasing pin 67 is affixed to reset disk 43 so as to project therefrom and to lie inside bushing 64 in the groove 62 as shown in Figure 8 when the camming recess 66 is in register with pin 56. Bushing 64, of course, is an aid to easy assembling of the device.

Reset disk 43 is also provided with a rectangular slot 68 in substantially tangential relation to an arc about the center of shaft 10 with radius equal that on which the center of pin 56 lies (Figure 7). Disk 43 may be turned so that the slot 68 is aligned to register with pin 56. In this slot lies the reset latch 69 which is pivoted to swing toward and away from pin 56 on the screw 70. Screw 70 is inserted through a hole 71 from the circumferential surface of reset disk 43 and passes through latch 69 and is threaded into the disk 43. A small coil spring 72 is contained in hole 71, about screw 70, extending from the head thereof to the latch 69.

Latch 69 is provided with a hooked tooth 73 to engage the adjacent end of pin 56 in opposition to the biasing action of spring 63. The end of pin 56 engaged by latch 69 is preferably notched to provide a reverse taper at 74 on the end of pin 56 of the order of about 30 degrees. This tapered surface and the surface of the hooked tooth 73 on latch 69 which contacts it, should be substantially normal to a line from the center of screw 70 to the center of contact between the hooked tooth 73 and tapered notch at 74 (Figure 9).

Latch 69 may also be provided with a projecting thumb piece 75, which, when pressed, causes the latch to disengage from pin 56. A nose 76 may also be provided on latch 69 which, when struck by the pin 56, causes the hooked tooth 73 to engage with pin 56. A stop 77 may also be provided on latch 69 to prevent its turning farther toward the driven member 42 than necessary to engage pin 56. This last feature is an aid in assembling the device. A curved groove 78 in the adjoining face of driven member 42 is provided to contain the hooked tooth 73 and the nose 76 of latch 69 when reset disk 43 is turned with respect to driven member 42 from a position when the camming recess 66 is in register with pin 56 to a position when latch 69 is in engagement with pin 56.

Reset disk 43 and driven member 42 are axially held mutually adjacent and loosely adjacent the driving member 41, which abuts shoulder 46, by the collar 79 which is fastened to the reduced end 65 of shaft 10 by means of set screw 80 which is seated in the key slot 81.

In order that the square drive pin 56 and its cooperating socket 51 may be maintained in alignment, a longitudinally extending groove 82 is provided in the circumferential surface of button 48 (Figures 5 and 6). Groove 82 also serves, with the cooperating set screw 82 in the driving member 41, to limit the axial movement of button 48 in its well 47.

In operation, the device shown in Figures 5–9 is similar to that shown in Figures 1–4. It has been found that the operation of latch 69 is more successful when its latching action is opposed to the direction of rotation of the drive, so the preferred direction of rotation is indicated in Figures 5–8 by arrows.

When the clutch is engaged, the driving member 41 rotates on shaft 10 and carries with it the driven member 42 because of the driving connection between button 48 and pin 56. The notched end of pin 56 being larger than slot 68, pin 56 abuts the flat, holding surface of reset disk 43 and is prevented thereby from axially sliding to the left as viewed in Figures 5 and 9. The other, tapered end of pin 56 is seated in the socket 51 of button 48 which is held in contact therewith by the pressure of spring 49. This spring pressure is also transmitted by pin 56 to the holding surface of reset disk 43, which pressure prevents disk 43 from turning with respect to the driven member 42. The camming recess 66 in reset disk 43 is out of register with pin 56 in driven member 42. The biasing pin 67 of the reset disk 43, in its bushing 64, is in the position in groove 62 indicated at 64a in Figure 8 with spring 63 compressed. The pressure of spring 63 urges disk 43 to turn with respect to driven member 42 but this pressure is not sufficiently great to overcome the friction of pin 56 as it presses against the holding surface of the reset disk 43 because of the pressure of spring 47.

Since driven member 42 is keyed to shaft 10 by reason of its being mounted on the square portion 55 thereof, driven member 42 causes shaft 10 to rotate, as driven member 42 is carried with the driving member 41, until the driving connection is broken. The end of pin 56 and the sides of socket 51 are tapered resulting in a camming action causing button 48 to be pushed deeper into the well 47 against spring 49, when an overload is experienced by the device. When such an overload occurs, and button 48 moves deeper into well 47, drive pin 56 is released from socket 51. A clear path for the still protruding end of pin 56 is provided by the groove 53 and the pin travels in groove 53 as the driving member 41 begins to turn with respect to driven member 42, which has been slowed down or stopped as a consequence of the overload. Reset disk 43, being now released from frictional engagement with the end of pin 56, turns with respect to member 42 by reason of the pressure exerted by spring 63 on the biasing pin 67. The camming recess 66 thereupon is aligned with pin 56.

As driving member 41 continues to rotate with respect to driven member 42, the projecting end of the trip rod 60 is contained in the small groove 54, and the end of drive pin 56 is contained in the groove 53. Button 48 again comes into contact with pin 56, driving member 41 having made a substantially complete revolution with respect to driven member 42. As the tapered head 50 of button 48 strikes pin 56, the pin is forced into recess 66 and no longer protrudes to interfere with button 48. The button is thereafter spring pressed against the adjacent face of the driven member 42 so that the driving member 41 is free to rotate without chattering or interfering parts until the clutch is reset.

To reset the clutch, the driving member 41 is stopped. Reset disk 43 is then rotated in the direction of rotation of the device. Drive pin 56 is cammed out of the camming recess 66, by the tapered well surface thereof, into groove 53. The nose 76 of latch 69 strikes pin 56, swinging latch 69 about screw 70 until the hooked tooth 73 engages the tapered notch 74 in the end of pin 56. The reset disk 43 is now held by latch 69 from turning with respect to driven member 42 and in opposition to spring 63 which is now compressed. Driven member 42 may then be turned until the tapered end of pin 56 registers with button 48, strikes the tapered end 50 thereof, forces button 48 into the well 47 and pin 56 snaps into its seat in socket 51, ready for re-starting of the driving member 41.

In Figures 9 and 10, it will be noted that the head of button 48 adjacent pin 56, in addition to being tapered at 50, is slightly beveled toward its upper or leading edge, so that the lip of the socket 51 over which the tapered end of pin 56 is cammed, as the driving connection is made, is slightly lower than the lip which engages pin 56 to drive member 42 while the clutch is engaged. This bevel, of course, aids in the seating of pin 56 in socket 51, and the socket has sufficient depth at its leading side only to prevent disengagement between pin and socket under any ordinary back-lash movements of members 41 and 42.

As the drive pin 56 is cammed into engagement with its socket 51, the end of trip rod 60 comes into contact with the button 48 and is pushed to the left in Figure 9. The other end of the trip rod 60, being aligned with the latch member 69, strikes the latch and disengages it from pin 56. Spring 72 in the hole 71 extends from the head of the screw 70 to the latch 69 and brings pressure thereon, insuring that the latch will not rebound into re-engagement with the drive pin 56.

A notch 84, plainly shown in Figure 10, may be made in the leading lip of the socket 51 to assist the camming of the trip rod 60 toward latch 69 from its position in the annular groove 54 to its position in the hole 52 when pin 56 is seated in the socket 51.

The use of the latch 69 is helpful on machines so arranged that an operator cannot operate reset member 43 with one hand while he turns some part of the machine, and driven member 42 therewith, with the other hand.

It will be apparent that, in either the modification shown in Figures 1–4 or that in Figures 5–10, the clutch may be adapted to carry a heavier load without increasing the size or strength of springs 17 or 49 by adding one or more cooperating sets of buttons 16 or 48 and pins 23 or 56, and associated parts. Such a multiple pin clutch is indicated in Figure 11 which shows diagrammatically a further modification in which the reset disk 43a carries two latch members 69. The other parts of the clutch shown in Figure 11 are otherwise exactly the same as in the embodiment shown in Figures 5–10, there being two pins 56 carried by the member 42 and two buttons 48 and associated parts carried by the member 41.

The reset disk 43a, besides carrying two latches 69 and having two camming recesses 66, is further modified by having peripheral ratchet teeth 86. Pivoted to the frame of the machine (not shown) is the pawl 87, adapted for engagement with the teeth 86 when the solenoid 88 is energized. A spring 89 is provided for returning the pawl 87 to a position out of engagement with the teeth 86 when the solenoid 88 is no longer energized.

The solenoid 88 is wired in series with a battery or other source of power and a switch 90. It will be apparent that the switch 90 may be a manual switch conveniently located for use by the operator of the machine when he observes some reason for stopping the operation of the machine, as, for example, the breaking of the web or exhaustion of the supply in paper goods manufacture. Alternatively, an electric eye or other device adjacent the paper web may be used as the switch 90 to disengage the clutch automatically. Or the switch 90 may be a microswitch placed wherever desired on the machine of which the clutch shown in Figure 11 is a part and at any point remote from the clutch. In any of these situations, the clutch may be used as a safety device as well as an overload release.

In the event of an occurrence making it desirable that the clutch be disengaged, switch 90 is closed, either manually or automatically as described above, and, current then flowing to solenoid 88, the pawl 87 is swung on its pivot and engages a tooth 86. The rotation of the clutch parts being in the direction indicated in Figure 11, such engagement stops the rotation of reset disk 43a. The driven member 42 continues to turn and the reset disk 43a is held from turning by the pawl 87 until the pins 56 are aligned with the recesses 66. The pins are thereupon cammed out of their seats in the buttons 48 resulting in the disengagement of the clutch as described above.

While there is herein described and in the drawings shown, illustrative embodiments of the invention, it is to be understood that the invention is not limited thereto, but may comprehend other constructions, arrangements of parts, details and features without departing from the spirit of the invention. I desire to be limited, therefore, only by the scope of the appended claims.

I claim:

1. An automatic overload release clutch of the resettable type having a pin and socket connection normally drivingly connecting coaxial driving and driven members, one of which carries the pin and the other the socket, comprising in combination, a reset member mounted at one side of said pin-carrying member and movable with respect thereto, said socket-carrying member being located at the other side of said pin-carrying member, a hole in said pin-carrying member extending entirely therethrough and in which the pin is slidably mounted for axial movement, said pin being longer than said hole and being adapted to project alternately to extreme positions at either side of said pin-carrying member, said socket-carrying member being so constructed and arranged relative to said pin-carrying member as to provide a clear circular path for said pin when it occupies its extreme position toward said socket-carrying member, a well in said socket-carrying member located in said circular path, a button slidably mounted in said well, means for urging said button outwardly of said well toward engagement with said pin-carrying member, said button having a head in which said socket is located, said button head normally projecting into said circular path but being capable of movement against said urging means into said well to a position in which said head is substantially out of said path, whereby said button may be cammed out of engagement with said pin upon exertion of an overload on the driving connection, said reset member having a holding surface adapted to normally hold said pin in its extreme position toward said socket-carrying member and a camming surface adapted to cam said pin into said socket when a driving connection is to be established, said reset member being normally held against relative movement with respect to said pin-carrying member by the pressure exerted by said pin on said holding surface when the pin is in engagement with the socket, and yielding means effective when the driving connection is broken and the pin moves into said circular path, for moving said reset member to a position in which said holding surface is out of registry with said pin, whereby said pin is permitted to move to its extreme position toward said reset member.

2. An automatic overload release clutch as claimed in claim 1 wherein said reset member is provided with remote control means operable while said pin and socket are drivingly connected and said pin-carrying member is rotating, for holding said reset member, against the pressure exerted by said pin, for relative movement with respect to said pin-carrying member to a position in which said holding surface is out of registry with said pin, whereby said pin is permitted to move to its extreme position toward said reset member and the driving connection is thereby broken.

3. An automatic overload release clutch of the resettable type having a pin and socket connection normally drivingly connecting coaxial driving and driven members, one of which carries the pin and the other the socket, comprising in combination, a reset disk mounted coaxially with said members at one side of said pin-carrying member and rotatable with respect thereto, said socket-carrying member being located at the other side of said pin-carrying member, a hole in said pin-carrying member extending entirely therethrough and in which the pin is slidably mounted for axial movement, said pin being longer than said hole and being adapted to project alternately to extreme positions at either side of said pin-carrying member, said socket-carrying member being so constructed and arranged relative to said pin-carrying member as to provide a clear circular path for said pin when it occupies its extreme position toward said socket-carrying member, a well in said socket-carrying member located in said circular path, a button slidably mounted in said well, means for urging said button outwardly of said well toward engagement with said pin-carrying member, said button having a head in which said socket is located, said button head normally projecting into said circular path but being capable of movement against said urging means into said well to a position in which said head is substantially out of said path, whereby said button may be cammed out of engagement with said pin upon exertion of an overload on the driving connection, said reset disk having a holding surface adapted to normally hold said pin in its extreme position toward said socket-carrying member and a recess in said holding surface having a camming surface adapted to cam said pin into said socket when a driving connection is to be established, said reset disk being normally held against relative rotation with respect to said pin-carrying member by the pressure exerted by said pin on said holding surface when the pin is in engagement with the socket, and yielding means effective when the driving connection is broken and the pin moves into said circular path, for rotating said reset disk to a position in which said recess is in registry with said pin, whereby said pin is permitted to move to its extreme position toward said reset disk.

4. An automatic overload release clutch as claimed in claim 3 wherein said reset disk is provided with remote control means operable while said pin and socket are drivingly connected and said pin-carrying member is rotating, for holding said reset disk, against the pressure exerted by said pin, for relative rotation with respect to said pin-carrying member to a position in which said recess is in registry with said pin, whereby said pin is permitted to move to its extreme position toward said reset member and the driving connection is thereby broken.

5. The combination as claimed in claim 4 wherein said remote control means comprises a normally-disengaged pawl adapted to cooperate with ratchet teeth on the periphery of said reset disk, and means operable at will for bringing said pawl into engagement with said ratchet teeth to hold said disk against rotation.

6. The combination as claimed in claim 3 wherein said reset disk carries a latch pivotally connected thereto and adapted to cooperate with the adjacent end of said pin to hold said recess out of registry with said pin while a driving connection is being established, and means for tripping said latch upon making the driving connection.

7. The combination as claimed in claim 6 wherein the latch has a hook adapted to engage the end of said pin, and the latch tripping means comprises a rod slidable axially within said pin and normally protruding at the button end thereof, whereby when said pin is moved into engagement with said button, the protruding end of said rod is pushed within said pin and the other rod end trips the latch.

8. The combination as claimed in claim 3, wherein said yielding means comprises a biasing pin projecting from said reset disk, a curved groove in the surface of said pin-carrying member adjacent said reset disk and adapted to receive said biasing pin as said reset disk rotates with respect thereto, and spring means contained in said curved groove, whereby said reset disk is spring-biased with respect to said pin-carrying member for registration of said recess with said pin when the driving connection is broken.

9. The combination as claimed in claim 8 wherein a hooked latch is pivotally secured to said reset disk, said hooked latch being adapted to engage the adjacent end of said pin to oppose the spring-bias of said reset disk while a driving connection is being established, and means for tripping said latch upon making the driving connection.

References Cited in the file of this patent

UNITED STATES PATENTS

| | | |
|---|---|---|
| 1,555,984 | Karge et al. | Oct. 6, 1925 |
| 1,883,164 | Vassakos | Oct. 18, 1932 |

FOREIGN PATENTS

| | | |
|---|---|---|
| 87,260 | Germany | Apr. 28, 1920 |